A. C. SARGENT.
RAKE FOR WASHING MACHINES.
APPLICATION FILED JULY 16, 1908.
928,336.
Patented July 20, 1909.
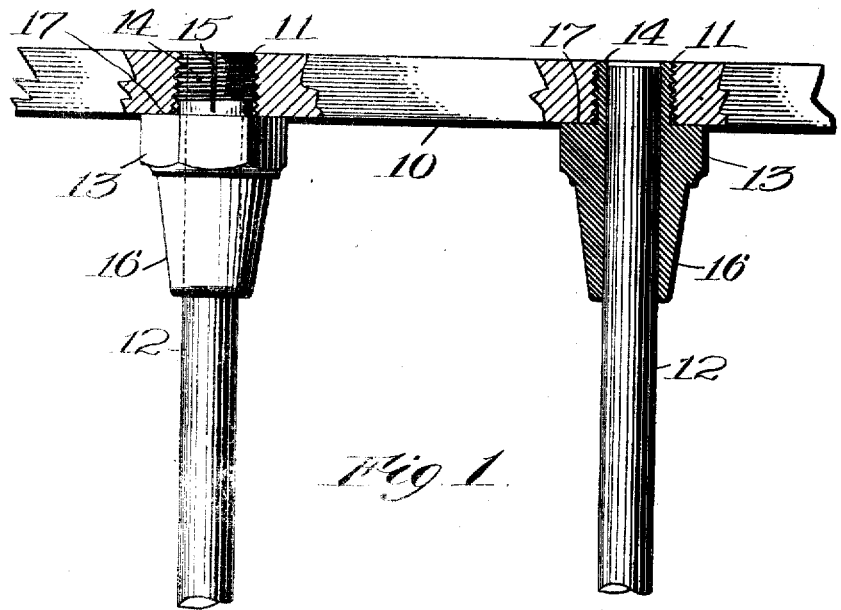
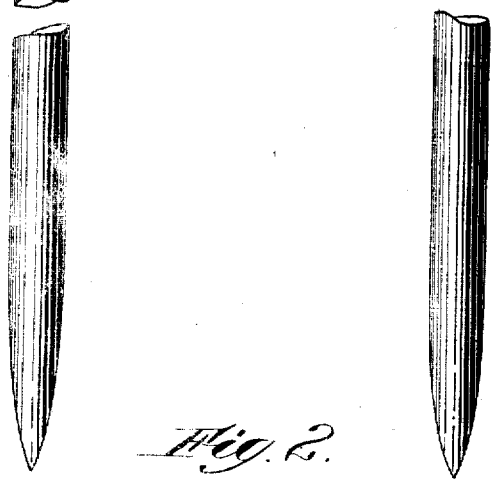
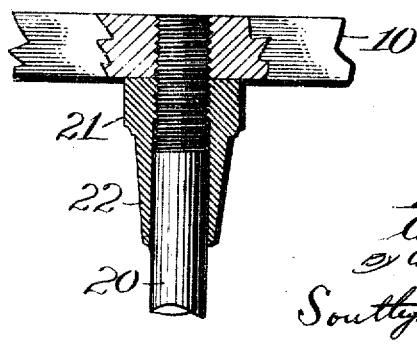

UNITED STATES PATENT OFFICE.

ALLAN C. SARGENT, OF WESTFORD, MASSACHUSETTS, ASSIGNOR TO CHARLES G. SARGENT'S SONS CORPORATION, OF WESTFORD, MASSACHUSETTS, A CORPORATION OF MASSACHUSETTS.

RAKE FOR WASHING-MACHINES.

No. 928,336.   Specification of Letters Patent.   Patented July 20, 1909.

Application filed July 16, 1908. Serial No. 443,843.

*To all whom it may concern:*

Be it known that I, ALLAN C. SARGENT, a citizen of the United States, residing at Westford, in the county of Middlesex and State of Massachusetts, have invented a new and useful Rake for Washing-Machines, of which the following is a specification.

This invention relates to a rake for washing machines, such as are employed for washing wool and the like. It has been found in practice that these rake teeth as ordinarily constructed tend to become bent in use when employed for heavy grades of material.

This invention is designed for the purpose of overcoming this defect without increasing the size of the brass teeth, and without adding materially to the expense thereof, and at the same time to provide an improved form of removable fastening device for the teeth which will properly hold the teeth in proper position, and at the same time will be less expensive than the form ordinarily employed. As now held in position these teeth are screwed into the rake head and held thereon by a clamp or locknut. This involves the provision of screw threads on three pieces, and the locking nut is not an absolutely certain holding device.

Further objects and advantages of the invention will appear hereinafter.

Reference is to be had to the accompanying drawings, in which—

Figure 1 shows a portion of a rake head partly in section with the preferred form of the invention applied thereto; and Fig. 2 shows a sectional view of a modification.

The rake-head 10 is preferably provided with slightly tapered openings 11 which are screw-threaded as usual, but are made of larger size than is ordinarily required. The rake-teeth 12 instead of being screw-threaded into these openings are preferably made entirely smooth and cylindrical. This makes the manufacture of the rake-teeth cheaper and permits them to be set at any desired position so that if the ends become worn they can be set up to a considerable degree without interfering with the security with which they are applied to the rake-head. On the butt ends of the rake-teeth are mounted cylindrically bored nuts or locking devices 13 which are provided with projecting slightly conical portions 14 screw-threaded to fit the openings 11. This projecting portion 14 is provided with longitudinal slits 15 so that when it is screwed into position it will have a clamping action on the end of the tooth, as will readily be understood. Integrally connected with this fastening device is a projecting sheath or sleeve 16 which extends along the tooth for any desired distance and in close contact therewith, so as to assist in supporting it. On account of this projection the teeth are prevented from bending or becoming distorted at a point near the rake-head, and therefore they can be used for heavier stock than otherwise would be the case. It will be understood, of course, that any tendency which there may be to bend the rake teeth will be transmitted through the sleeve to the shoulders 17 of the fastening device which rest against the flat surface of the rake-head. These shoulders, of course, are at a considerable distance from the axis of the tooth, and consequently they effectively resist the bending strain.

While I prefer to construct the device in the manner shown in Fig. 1, some features of the invention may also be carried out by the construction shown in Fig. 2, in which the rake-head 10 is screw-threaded and the rake tooth 20 is screw-threaded into the same. A nut 21 is also screw-threaded on the threads of the screw and serves as a locking nut, and it is provided with a sheath or sleeve 22 for the purpose above described, and acting in the same manner.

While I have illustrated and described two embodiments of the invention, I am aware that many modifications may be made therein by any person skilled in the art without departing from the scope of the invention as expressed in the claims. Therefore I do not wish to be limited to all the details of construction shown, but What I do claim is:—

1. A rake for a washing machine, comprising a head having a screw threaded opening, a sheath comprising a split hollow screw fitting said opening and an integral, solid hollow projection located on and abutting against one face of the head, and a smooth cylindrical tooth clamped tightly in said projection and screw and adapted to be supported and reinforced outside the head by the projection and securely fastened by the screw.

2. A rake for a washing machine, comprising a head having an opening, a sheath comprising a hollow projection and a square shoulder bearing on the head at a distance from the opening all around on the lower face of the head, and a tooth fitting in said projection, projecting from the bottom of the head at right angles thereto and adapted to be supported at a distance below the head by the projection, said tooth and sheath being located entirely below the top surface of the head.

3. In a rake for a washing machine, the combination of a head having a flat surface, a hollow sheath mounted on said head located entirely below the top surface thereof, and a rake tooth passing into and supported by said sheath and projecting from it at right angles to the bottom surface of the head, said sheath having a nut thereon directly engaging said surface of the head at a distance from the center of the nut and located between said surface and the point of the tooth and being provided with a conical projection extending from said nut a distance greater than the thickness of the nut and constituting a strut for supporting the tooth all around at a material distance from the head.

In testimony whereof I have hereunto set my hand, in the presence of two subscribing witnesses.

ALLAN C. SARGENT.

Witnesses:
ARTHUR E. DAY,
OSBORN H. CILLEY.